United States Patent [19]
Torigai et al.

[11] Patent Number: 6,038,321
[45] Date of Patent: Mar. 14, 2000

[54] DATA TRANSFER METHOD, COMMUNICATION SYSTEM AND STORAGE MEDIUM

[75] Inventors: Masamichi Torigai; Mikio Fujii, both of Yokohama, Japan

[73] Assignee: Laurel Intelligent Systems Co., Ltd., Kanagawa, Japan

[21] Appl. No.: 08/794,233

[22] Filed: Jan. 30, 1997

[30] Foreign Application Priority Data

Aug. 8, 1996 [JP] Japan .................................. 8-209438

[51] Int. Cl.[7] ...................................................... H04L 9/00
[52] U.S. Cl. ........................ 380/268; 380/200; 380/210; 380/255; 380/287; 713/189; 713/200; 713/201
[58] Field of Search .................................. 380/9, 21, 23, 380/25, 28, 42, 43, 44, 46, 49, 50, 59, 29, 37, 10, 20, 200, 205, 210, 252, 255, 268, 277, 278, 287; 713/150, 168, 189, 200, 201

[56] References Cited

FOREIGN PATENT DOCUMENTS 156134 4/1980 Japan .

*Primary Examiner*—Bernarr E. Gregory
*Attorney, Agent, or Firm*—Bachman & Lapointe, P.C.

[57] ABSTRACT

In a communication system, a transmitter device encrypts variable-length data having a data length corresponding to a kind of information to be transferred or a communication capacity, using a natural random number, to produce a variable-length random number sequence. Then, the transmitter device performs an exclusive OR operation per bit between the variable-length random number sequence and the information to produce transfer information, and transmits the transfer information to a receiver device. The transmitter device further transmits the variable-length data and the natural random number in an encrypted manner to the receiver device. The receiver device reproduces the variable-length data and the natural random number transmitted in the encrypted manner, and then encrypts the variable-length data using the natural random number to produce a variable-length random number sequence which is identical with the foregoing variable-length random number sequence produced at the transmitter device. Then, the receiver device performs an exclusive OR operation per bit between the thus produced variable-length random number sequence and the received transfer information to reproduce the original information.

18 Claims, 6 Drawing Sheets

DATA TRANSFER METHOD, COMMUNICATION SYSTEM AND STORAGE MEDIUM

BACKGROUND OF THE INVENTION

1. Field of the Invention

The present invention relates to a technique for transferring digital data using, for example, a satellite broadcast, a CATV (cable television) or a public or other network and, in particular, to a technique which can ensure data identity and security upon data transfer.

2. Description of the Prior Art

Owing to development of the data communication technique and the multimedia technique, utilization or application of digital data (hereinafter also referred to as "information") has been largely expanded and, following this, there have been various data transfer methods, for example, using the satellite broadcast, the CATV, the Internet and the Intranet. Under the circumstances, when transferring highly valuable or secret information to a user from a provider, particularly using the public or other network which is not under control of the provider, the reliable security for preventing an unjust or unfair reception of the information by a third party is essential, in addition to ensuring the identity of the contents of the information.

For example, when transferring chargeable information relating to movie, electronic publication, home medical care, education or the like from a provider to members in the membership communication system, change in content of the information or unfair reception and utilization of the information by a third party, other than the member, should be prevented. A cryptographic technique is effective as a preventive measure thereof. Particularly, when putting much weight on ensuring the identity of the contents of the information, a stream cryptographic technique is quite effective.

In the stream cryptographic technique, the same random number bit sequences are generated at a data transmitter device (encrypting or encoding side) and a data receiver device (decrypting or decoding side), an exclusive OR operation is performed per bit between the random number bit sequence and the information so as to derive the cipher information (encrypted information) at the data transmitter device, and an exclusive OR operation is performed per bit between the same random number bit sequence and the cipher information at the data receiver device so as to decode the cipher information. Since the processing is performed per bit of the information, an error caused during data transfer is not expanded upon decrypting the cipher information so that this technique is suitable for transferring the large-amount information at high rate and with high accuracy. The cryptographic techniques including the stream cryptographic technique are described in "Introduction to Information Theory" (by EiJi Okamoto, Kyoritsu Publishing, 1993).

As described above, when reproducing the original information from the cipher information at the data receiver device, the exclusive OR operation is performed per bit relative to the cipher information using the same random number bit sequence as was used at the data transmitter device. To obtain the same random number bit sequences at the data transmitter and receiver devices is called synchronization. There are available an external synchronization method and a self-synchronization method. In the external synchronization method, data transmitter and receiver devices produce random number bit sequences independently of each other and send data for synchronization to each other. On the other hand, in the self-synchronization method, a data receiver device autonomously produces a random number bit sequence based on received cipher information and thus synchronization is automatically achieved after receipt of a given fixed length of the cipher information.

However, in either of the foregoing synchronization methods, random number generating means are required both at the data transmitter device and at the data receiver device. Accordingly, in the communication system where a plurality of data receiver devices exist relative to one data transmitter device, the installation cost increases largely. Further, since the process for synchronization is essential, it is not suitable for the high-speed processing. Particularly, it takes much time to achieve synchronization in the self-synchronization method and thus it has been very difficult to deal with information, such as dynamic images (animation), requiring rapid processing. Further, in the stream cryptographic technique, it has been a serious problem to ensure difficulty in interpreting a random number bit sequence which is a key for encryption.

SUMMARY OF THE INVENTION

Therefore, it is an object of the present invention to provide an improved data transfer method.

It is another object of the present invention to provide an improved communication system.

It is another object of the present invention to provide an improved storage medium having a functional descriptive material which is readable and executable by a computer.

According to one aspect of the present invention, a data transfer method for transferring digital data from a data transmitter device to a data receiver device, comprises a data transmitting step performed by the data transmitter device and a data reproducing step performed by the data receiver device, the data transmitting step comprising the steps of: producing variable-length data having a data length corresponding to the digital data; encrypting the variable-length data using at least one natural random number to produce a first variable-length random number sequence; performing an exclusive OR operation per bit between the first variable-length random number sequence and the digital data to derive transfer data; transmitting the transfer data to the data receiver device; and transmitting the variable-length data and the at least one natural random number in an encrypted manner to the data receiver device, and the data reproducing step comprising the steps of: reproducing the variable-length data and the at least one natural random number; encrypting the variable-length data using the at least one natural random number to produce a second variable-length random number sequence; and performing an exclusive OR operation per bit between the second variable-length random number sequence and the transfer data transmitted from the data transmitter device to reproduce the digital data.

According to another aspect of the present invention, a data transfer method for transferring digital data from a data transmitter device to a data receiver device, comprises a data transmitting step performed by the data transmitter device and a data reproducing step performed by the data receiver device, the data transmitting step comprising the steps of: producing variable-length data having a data length corresponding to the digital data; encrypting the variable-length data using a first natural random number to produce a first variable-length random number sequence; performing exclusive OR operations between the first variable-length random number sequence and a reference logical value to derive a second variable-length random number sequence; encrypting the second variable-length random number sequence using a second natural random number to derive a third variable-length random number sequence; performing an exclusive OR operation per bit between the third variable-length random number sequence and the digital data to derive transfer data; transmitting the transfer data to the data receiver device; and transmitting the variable-length data, the first and second natural random numbers and data indicative of the using order of the first and second natural random numbers in an encrypted manner to the data receiver device, and the data reproducing step comprising the steps of: reproducing the variable-length data, the first and second natural random numbers and the using order indicative data; encrypting the variable-length data using the first and second natural random numbers and the using order indicative data to produce a fourth variable-length random number sequence which is identical with the third variable-length random number sequence; and performing an exclusive OR operation per bit between the fourth variable-length random number sequence and the transfer data transmitted from the data transmitter device to reproduce the digital data.

It may be arranged that the transfer data is transferred from the data transmitter device to the data receiver device via a portable storage medium.

It may be arranged that a cryptographic algorithm of SXAL/MBAL is used for encryption.

According to another aspect of the present invention, a communication device for transferring digital data to a data receiver device, comprises variable-length data generating means for producing variable-length data having a data length corresponding to the digital data; random number acquiring means for acquiring at least one natural random number per transmission of the digital data; encrypting means for encrypting the variable-length data using the at least one natural random number to produce a variable-length random number sequence; a logic circuit for performing exclusive OR operations between the digital data and the variable-length random number sequence to derive transfer data; and communication setting means for sending the variable-length data and the at least one natural random number in an encrypted manner as well as the transfer data to the data receiver device.

It may be arranged that the communication setting means comprises authenticating means for performing an authentication process relative to the data receiver device, and encrypting means for encrypting the variable-length data and the at least one natural random number using a private key unique to the data receiver device when a result of the authentication process is positive, and that the communication setting means sends the variable-length data and the at least one natural random number, encrypted by the encrypting means, to the data receiver device.

According to another aspect of the present invention, a communication device for transferring digital data to a data receiver device, comprises variable-length data generating means for producing variable-length data having a data length corresponding to the digital data; random number acquiring means for acquiring first and second natural random numbers per transmission of the digital data; encrypting means for encrypting the variable-length data using the first natural random number to produce a first variable-length random number sequence, performing exclusive OR operations between the first variable-length random number sequence and a reference logical value to produce a second variable-length random number sequence, and encrypting the second variable-length random number sequence using the second natural random number to produce a third variable-length random number sequence; a logic circuit for performing exclusive OR operations between the digital data and the third variable-length random number sequence to derive transfer data; and communication setting means for sending the variable-length data, the first and second natural random numbers and data indicative of the using order of the first and second natural random numbers in an encrypted manner as well as the transfer data to the data receiver device.

It may be arranged that the communication setting means comprises authenticating means for performing an authentication process relative to the data receiver device, and encrypting means for encrypting the variable-length data, the first and second natural random numbers and the using order indicative data using a private key unique to the data receiver device when a result of the authentication process is positive, and that the communication setting means sends the variable-length data, the first and second natural random numbers and the using order indicative data, encrypted by the encrypting means, to the data receiver device.

According to another aspect of the present invention, a communication device comprises data acquiring means for acquiring transfer data derived as results of exclusive OR operations between digital data and a first variable-length random number sequence, and variable-length data and at least one natural random number used for deriving the first variable-length random number sequence; encrypting means for encrypting the variable-length data using the at least one natural random number to produce a second variable-length random number sequence; and a logic circuit for performing exclusive OR operations between the transfer data and the second variable-length random number sequence to reproduce the digital data.

According to another aspect of the present invention, a communication device comprises data acquiring means for acquiring transfer data derived as results of exclusive OR operations between digital data and a first variable-length random number sequence, and variable-length data and first and second natural random numbers used for deriving the first variable-length random number sequence; encrypting means for encrypting the variable-length data using the first natural random number to produce a second variable-length random number sequence, performing exclusive OR operations between the second variable-length random number sequence and a reference logical value to produce a third variable-length random number sequence, and encrypting the third variable-length random number sequence using the second natural random number to produce a fourth variable-length random number sequence which is identical with the first variable-length random number sequence; and a logic circuit for performing exclusive OR operations between the transfer data and the fourth variable-length random number sequence to reproduce the digital data.

It may be arranged that the encrypting means uses a cryptographic algorithm of SXAL/MBAL for encryption.

According to another aspect of the present invention, a storage medium has a functional descriptive material which is readable and executable by a computer, the functional descriptive material allowing the computer to execute the steps of: producing variable-length data having a data length corresponding to digital data; encrypting the variable-length data using at least one natural random number to produce a variable-length random number sequence; performing an exclusive OR operation per bit between the variable-length random number sequence and the digital data to produce transfer data; transmitting the transfer data to a data receiver device; and transmitting the variable-length data and the at least one natural random number in an encrypted manner to the data receiver device.

According to another aspect of the present invention, a storage medium has a functional descriptive material which is readable and executable by a computer, the functional descriptive material allowing the computer to execute the steps of: acquiring transfer data derived as results of exclusive OR operations between digital data and a first variable-length random number sequence, and variable-length data and at least one natural random number used for deriving the first variable-length random number sequence; encrypting the variable-length data using the at least one natural random number to produce a second variable-length random number sequence; and performing exclusive OR operations between the transfer data and the second variable-length random number sequence to reproduce the digital data.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

Figure 1:
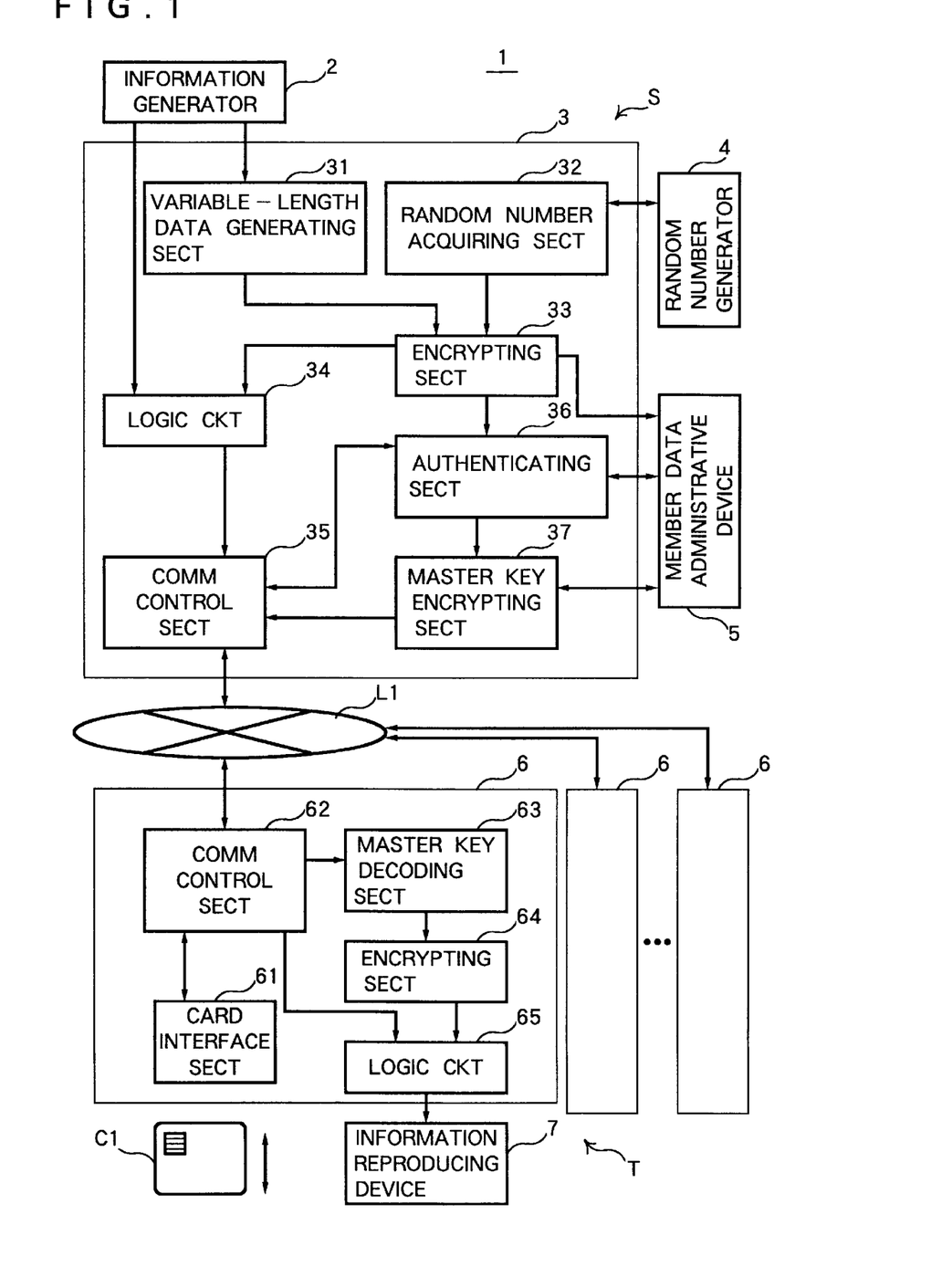
FIG. 1 is a block diagram showing a structure of a communication system according to a first preferred embodiment of the present invention.

FIG. 1 is a block diagram showing a structure of a membership communication system 1 according to a first preferred embodiment of the present invention. In this preferred embodiment, chargeable information is transferred via a public network L1.

The communication system 1 includes a member administrative server S, as a data transmitter device, and a plurality of member terminals T, as data receiver devices, which are connected to the public network L1, respectively. When an IC card C1, storing a private net-key unique to a member or a public net-key common to all the members, is loaded, the member terminal T performs a user authentication relative to the loaded IC card C1 in the known manner. When a user is genuine, the member terminal T allows an access to the member administrative server S.

First, a structure of the member administrative server S will be described hereinbelow.

As shown in FIG. 1, the member administrative server S includes an information generator 2, a communication device 3, a random number generator 4 and a member data administrative device 5.

The information generator 2 produces chargeable information to be transferred. The information generator 2 includes an analog/digital converter for converting analog data components, such as dynamic images (animation), to digital data components. The random number generator 4 generates one or a plurality of natural random numbers. The member data administrative device 5 holds and administrates member data, such as member ID's (identification numbers), member private net-keys and member account data (account files).

The communication device 3 includes a variable-length data generating section 31, a random number acquiring section 32, an encrypting section 33, a logic circuit 34, a communication control section 35, an authenticating section 36 and a master key encrypting section 37.

The variable-length data generating section 31 produces variable-length data having a data length corresponding to a kind of the information produced at the information generator 2 or a communication capacity. For example, the variable-length data is generated per display image of the static images or per display image of the dynamic images. The variable-length data is digital data having a given bit string. The random number acquiring section 32 acquires the natural random number/numbers from the random number generator 4 upon every transmission of the information. The encrypting section 33 generates a variable-length random number sequence based on the variable-length data and the natural random number/numbers. A SXAL/MBAL is used for encryption, which will be described later in detail.

The logic circuit 34 performs an exclusive OR operation per bit between the information generated at the information generator 2 and the variable-length random number sequence generated at the encrypting section 33 so as to stream-encrypt the information. The stream-encrypted information will be referred to as transfer information. The communication control section 35 performs necessary setting for communication so as to transmit the foregoing transfer information and later-described notice data to the respective member terminals T, while receives data from the member terminals T.

The authenticating section 36 performs an authentication process relative to an access from the corresponding member terminal T. When the result of authentication at the authenticating section 36 is positive, that is, the member is genuine, the master key encrypting section 37 sets the variable-length data and the natural random number/numbers (including data about the using order of the natural random numbers when the plurality of numbers are used), which are also used at the encrypting section 33, as a transmission master key, and encrypts the transmission master key based on a private net-key of the corresponding member. Then, the encrypted master key is transmitted as notice data from the communication control section 35 to the corresponding member terminal T. The SXAL/MBAL is used for encryption.

Now, a structure of the member terminal T will be described hereinbelow. Each member terminal T has the same structure in this preferred embodiment.

In FIG. 1, the member terminal T includes a communication device 6 and an information reproducing device 7. The information reproducing device 7 is an image receiving device for displaying the decoded information and may correspond to the foregoing information generator 2. The communication device 6 includes a card interface section 61, a communication control section 62, a master key decoding section 63, an encrypting section 64 and a logic circuit 65.

The card interface section 61 detects loading/unloading of the IC card C1 and performs an authentication process relative to the loaded IC card C1 in the known manner. The card interface section 61 has a further function of sending selection data of information, which was selected by the user of the member terminal T from an information menu displayed on a display unit (not shown), to the communication control section 62. The communication control section 62 performs necessary setting for communication relative to the member administrative server S and sends the result of authentication and the information selection data to the member administrative server S, while receives the foregoing transfer information and the foregoing notice data from the member administrative server S. The master key decoding section 63 decrypts the notice data received at the communication control section 62 to derive the foregoing transmission master key and sends this transmission master key, that is, the variable-length data and the natural random number/numbers (including the data about the using order of the natural random numbers when the plurality of numbers are used), to the encrypting section 64. The SXAL/MBAL is used for decryption.

The encrypting section 64 encrypts the received variable-length data using the received natural random number/numbers as a key/keys through the SXAL/MBAL, so as to obtain a variable-length random number sequence. If the result of authentication at the authenticating section 36 is positive, that is, the member is genuine, this variable-length random number sequence derived at the encrypting section 64 becomes identical with the variable-length random number sequence derived at the member administrative server S. The logic circuit 65 performs an exclusive OR operation per bit between the transfer information received at the communication control section 62 and the variable-length random number sequence outputted from the encrypting section 64, and successively outputs the results of exclusive OR operations to the information reproducing device 7.

The foregoing sections 31 to 37 in the communication device 3 of the member administrative server S and the foregoing sections 61 to 65 in the communication device 6 of the member terminal T are normally realized through execution, by a CPU of a computer, of given processes according to functional descriptive materials or computer programs stored in storing means such as a ROM. The computer programs are not necessarily inseparable from the computer, and thus may be separable from the computer. Specifically, it may be arranged that the program which gives the function of the communication device 3 to the computer and the program which gives the function of the communication device 6 to the computer are physically substantiated on a storage medium, such as a flexible disk, a hard disk or a CD-ROM, in such a manner that the computer can read and execute them.

It may further be arranged that programs which partly or wholly realize the functions of the information generator 2, the random number generator 4, the member data administrative device 5 and the information reproducing device 7 are substantiated on the storage medium, in addition to those for the communication devices 3 and 6.

Now, the SXAL/MBAL used at the encrypting section 33 and the master key encrypting section 37 of the member administrative server S and at the master key decoding section 63 and the encrypting section 64 of the member terminal T will be described hereinbelow. The SXAL/MBAL is a cryptographic algorithm which was made public in 1993 and registered under ISO/IEC9979-0012 at the ISO (International Organization for Standardization) in 1995. The SXAL/MBAL is a combination of a block-unit cryptographic algorithm called SXAL and a multiblock-unit cryptographic algorithm called MBAL.

Details of the SXAL/MBAL are introduced, for example, in the Nikkei Electronics, the third edition No. 658 issued on Mar. 26, 1996. The main feature resides in that data to be encrypted can be arbitrarily changed per byte unit. Further, in a DES (data encryption standard) type algorithm, a unidirectional process is performed to successively encrypt data from the head to the end. On the other hand, in the SXAL/MBAL, data displacement is repeated in plural times (desired times) from the head to the end and from the end to the head in the data, which makes decryption of the encrypted data quite difficult.

Figure 2:
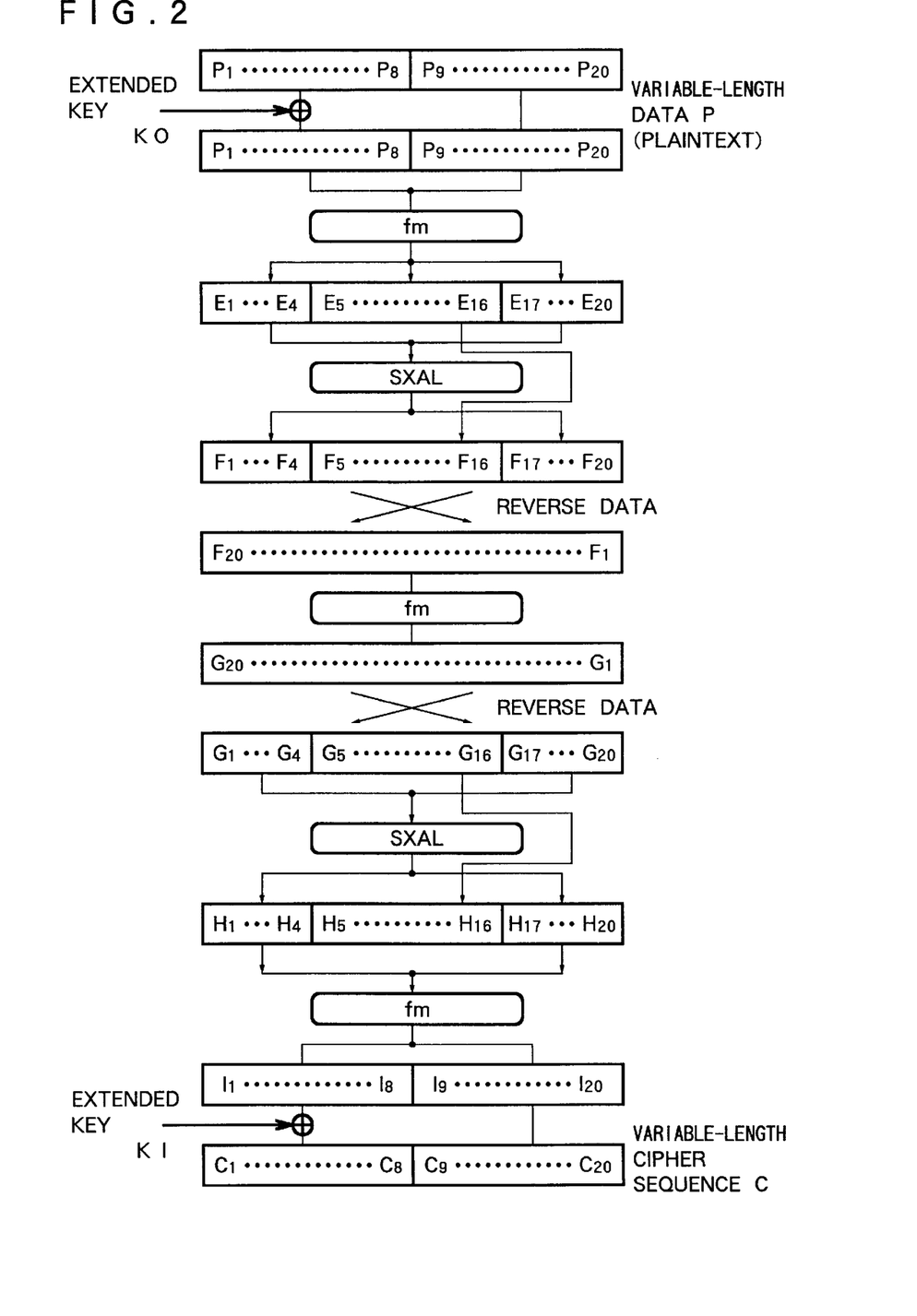
FIG. 2 is a diagram for explaining a SXAL/MBAL employed in the first preferred embodiment of the present invention.

FIG. 2 is a diagram for explaining the SXAL/MBAL in further detail.

In the example shown in FIG. 2, 20-byte variable-length plaintext data P is encrypted using an 8-byte (64-bit) encryption key K so as to derive a 20-byte variable-length cipher sequence C. In the figure, P, E, F, G, H, I and C represent data in the respective conversion processes, subscript numbers thereof represent the byte numbers, and fm. represent encrypting functions.

First, exclusive OR operations are performed between left-end 8 bytes of the variable-length data P and an extended key KO, and the results are subjected to data conversion using the encrypting function fm. Then, left-end 4 bytes and right-end 4 bytes are subjected to data conversion through the SXAL, while the remainder is held unchanged. Subsequently, the order of the data is reversed and the data is subjected to data conversion using the encrypting function fm. Thereafter, the order of the data is reversed. Then, left-end 4 bytes and right-end 4 bytes are subjected to data conversion through the SXAL, while the remainder is held unchanged. Subsequently, the data is subjected to data conversion using the encrypting function fm. Then, exclusive OR operations are performed between left-end 8 bytes of the data and an extended key KI so as to derive the encrypted variable-length cipher sequence C.

The extended keys KO and KI are derived from the encryption key K in the known manner.

In this preferred embodiment, the foregoing SXAL/MBAL is used for ensuring the data security when performing the high-speed transfer of the large-amount data, in view of the fact that encryption can be achieved per unit of data or file no less than 16 bytes so that encryption per Mbyte amount can be realized, that encryption is achieved by performing the bi-directional data displacement so that decryption is quite difficult, and that, when encountering a data change or alteration even on a one-bit basis during data transfer, the normal decoding of any of the data becomes impossible. Particularly, in the DES type algorithm, when encountering a data change or alteration on a one-bit basis during data transfer, only a data portion subjected to the data change or alteration and data portions near that data portion or data portions subsequent to that data portion are not decoded normally so that detection of abnormality is quite difficult at the data receiver side. On the other hand, in the SXAL/MBAL, since all the data portions are changed to abnormal, detection of abnormality is quite easy. Thus, a proper countermeasure can be quickly taken, for example, requesting retransmission of data during communication or using a backup file in case of a file.

Now, communication procedures in the communication system 1 will be described hereinbelow with reference to FIGS. 3 to 5.

Figure 3:
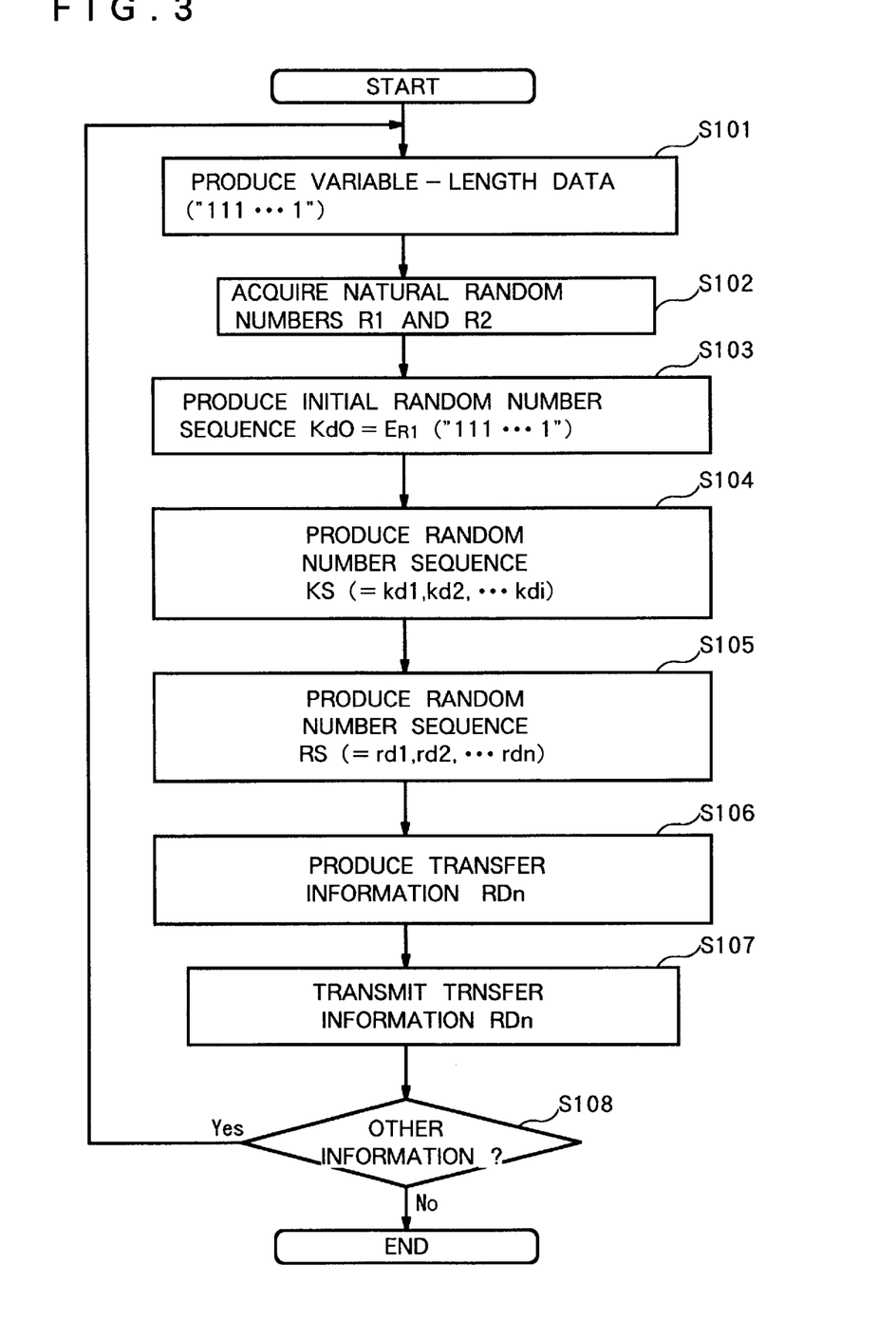
FIG. 3 is a diagram for explaining an information transmission procedure performed in a member administrative server.

FIG. 3 is an explanatory diagram showing an information transmission procedure performed in the communication device 3 of the member administrative server S, wherein information selected by one of the member terminals T is transmitted to the corresponding member terminal T.

In FIG. 3, first at step S101, the communication device 3 produces variable-length data ("111 . . . 1") corresponding to a transmission unit Fs, such as one frame, of the information selected at the member terminal T and generated at the information generator 2 (hereinafter, the information of the transmission unit Fs will be referred to as "Fs information"). Then, at step S102, the communication device 3 acquires two natural random numbers R1 and R2 from the random number generator 4. As appreciated, each of the natural random numbers R1 and R2 is in the form of a bit sequence of a given number of bits. Subsequently, at step S103, the variable-length data ("111 . . . 1") is encrypted through the SXAL/MBAL using the natural random number R1 as an encryption key to produce an initial variable-length random number sequence kd0 (=$E_{R1}$("111 . . . 1")) which corresponds to the variable-length cipher sequence C in FIG. 2. Then, at step S104, exclusive OR operations are performed between the corresponding bytes of the initial random number sequence kd0 and a reference logical value 01 h so as to produce a variable-length random number sequence KS (=kd1, kd2, . . . kdi). In the random number sequence KS, kd1 represents the results of exclusive OR operations between the first byte of Kd0 and the reference logical value 01 h, kd2 represents the results of exclusive OR operations between the second byte of kd0 and the reference logical value 01 h, and kdi represents the results of exclusive OR operations between the i-th byte of kd0 and the reference logical value 01 h. Subsequently, at step S105, the random number sequence KS is encrypted through the SXAL/MBAL using the natural random number R2 as an encryption key to produce a variable-length random number sequence RS (=rd1, rd2, . . . rdn: variable-length cipher sequence). In the random number sequence RS, rd1 represents the result of encryption of kd1, rd2 represents the result of encryption of kd2, and rdn represents the result of encryption of kdi. As appreciated, if the number of the natural random numbers is greater than two, steps S104 and S105 are further executed correspondingly. Then, at step S106, an exclusive OR operation is performed per bit between the thus produced random number sequence RS and the foregoing Fs information to produce transfer information RDn. Subsequently, at step S107, the produced transfer information RDn is transmitted to the corresponding member terminal T via the public network L1. Every time the transfer information RDn is transmitted, account data is produced and stored in an account file of the corresponding member ID in the member data administrative device 5.

Subsequently, at step S108, it is checked whether further information for transmission remains. If positive, the procedure returns to step S101 to repeat the foregoing steps. On the other hand, if negative, that is, no further information for transmission remains, the transmission procedure is terminated.

Now, authentication processes performed in the member terminal T and between the member terminal T and the member administrative server S as well as transmission processes of notice data will be described with reference to FIG. 4.

Figure 4:
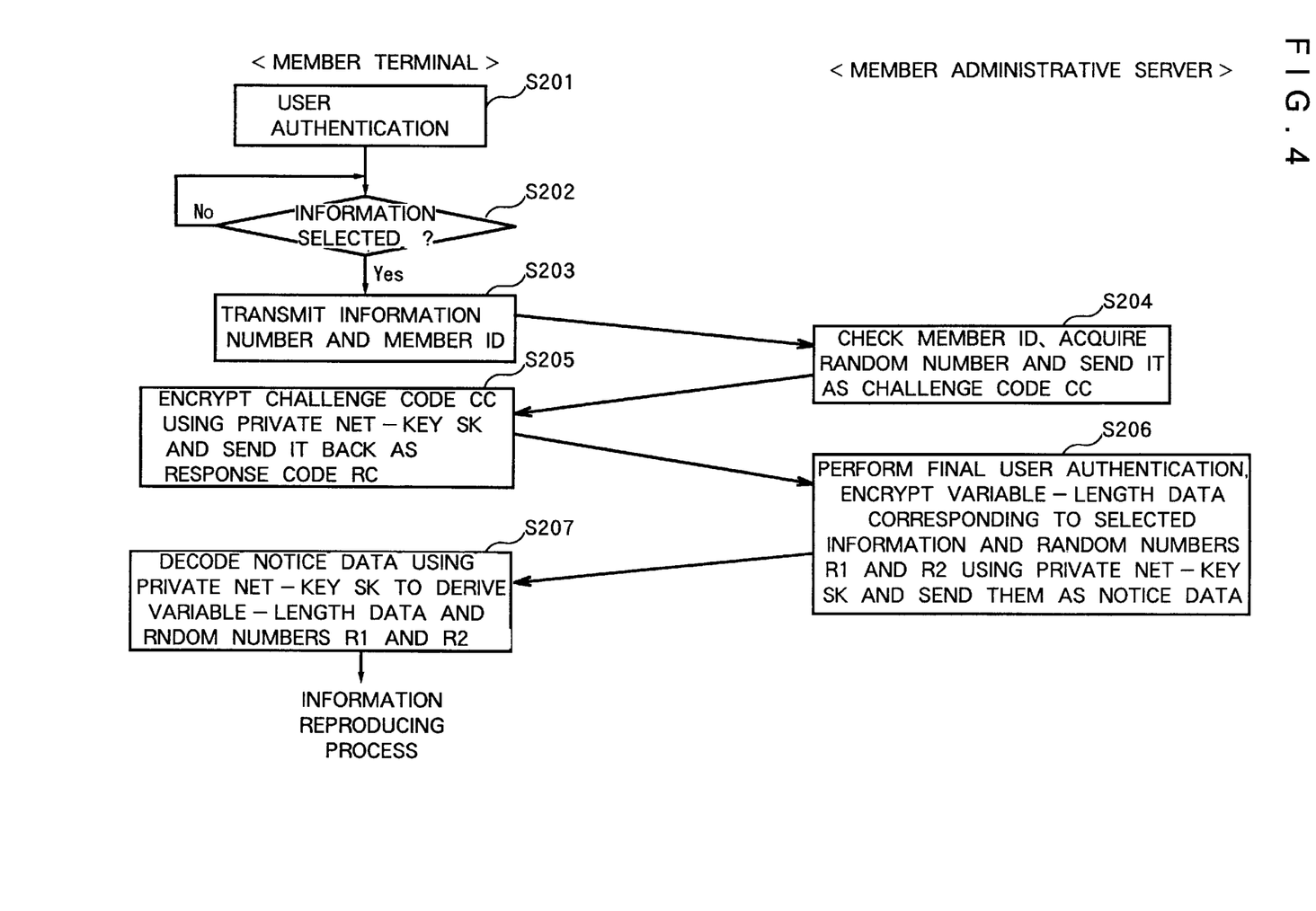
FIG. 4 is a diagram for explaining authentication processes performed in a member terminal and between the member terminal and the member administrative server as well as transmission processes of notice data.

In FIG. 4, first at step S201, a user authentication is performed. Specifically, after loading the IC card C1, the user inputs a member ID and a password. Then, the card interface section 61 checks the inputted password. If there is the limit in recipient qualification, such as the age limit, the card interface section 61 also checks it. When the result of authentication is negative, that is, the password is not matched, or the recipient qualification is not satisfied, the member terminal T prohibits an access to the member administrative server S. On the other hand, if the result of authentication is positive, the member terminal T awaits selection of information (selection of one of information numbers) by the user at step S202. If the selection of information is detected at step S202, the procedure advances to step S203 where the selected information number and the member ID are sent to the member administrative server S via the communication control section 62. Then, at step S204, in the member administrative server S, the authenticating section 36 checks the received member ID with the member ID's stored in the member data administrative device 5 and, if matched, acquires a proper natural random number from the random number generator 4. The authenticating section 36 holds the acquired natural random number as a challenge code CC and further transmits it as the challenge code CC to the member terminal T via the communication control section 35. On the other hand, if not matched, that is, no matching is achieved between the received member ID and the stored member ID's, the access from the member terminal T is rejected. Subsequently, at step S205, in the member terminal T, the card interface section 61 encrypts the received challenge code CC using a private net-key SK stored in the loaded IC card C1, and sends back the encrypted challenge code CC as a response code RC to the member administrative server S. Then, at step S206, in the member administrative server S, the authenticating section 36 performs the final user authentication. Specifically, the authenticating section 36 decodes the received response code RC using a private net-key SK of the corresponding member stored in the member data administrative device 5 to derive a challenge code CC and checks whether the thus derived challenge code CC matches the foregoing challenge code CC held in the authenticating section 36. If matched, that is, the member is genuine, the master key encrypting section 37 encrypts the variable-length data corresponding to the selected information and the natural random numbers R1 and R2, that is, the transmission master key, using the private net-key of the corresponding member, and transmits the encrypted master key as the notice data to the corresponding member terminal T via the communication control section 35. Then, at step S207, in the member terminal T, the master key decoding section 63 decodes the received notice data using the private net-key SK stored in the loaded IC card C1 to derive the variable-length data and the natural random numbers R1 and R2, which will be used for reproducing the foregoing Fs information from the foregoing transfer information RDn.

As appreciated, the information transmission procedure shown in FIG. 3 is performed after the final user authentication reveals that the member is genuine at step S206. In this preferred embodiment, it is arranged that the transfer data RDn is transmitted to the member terminal T after transmission of the notice data.

Now, an information reproducing procedure performed in the communication device 6 of the member terminal T will be described hereinbelow with reference to FIG. 5.

Figure 5:
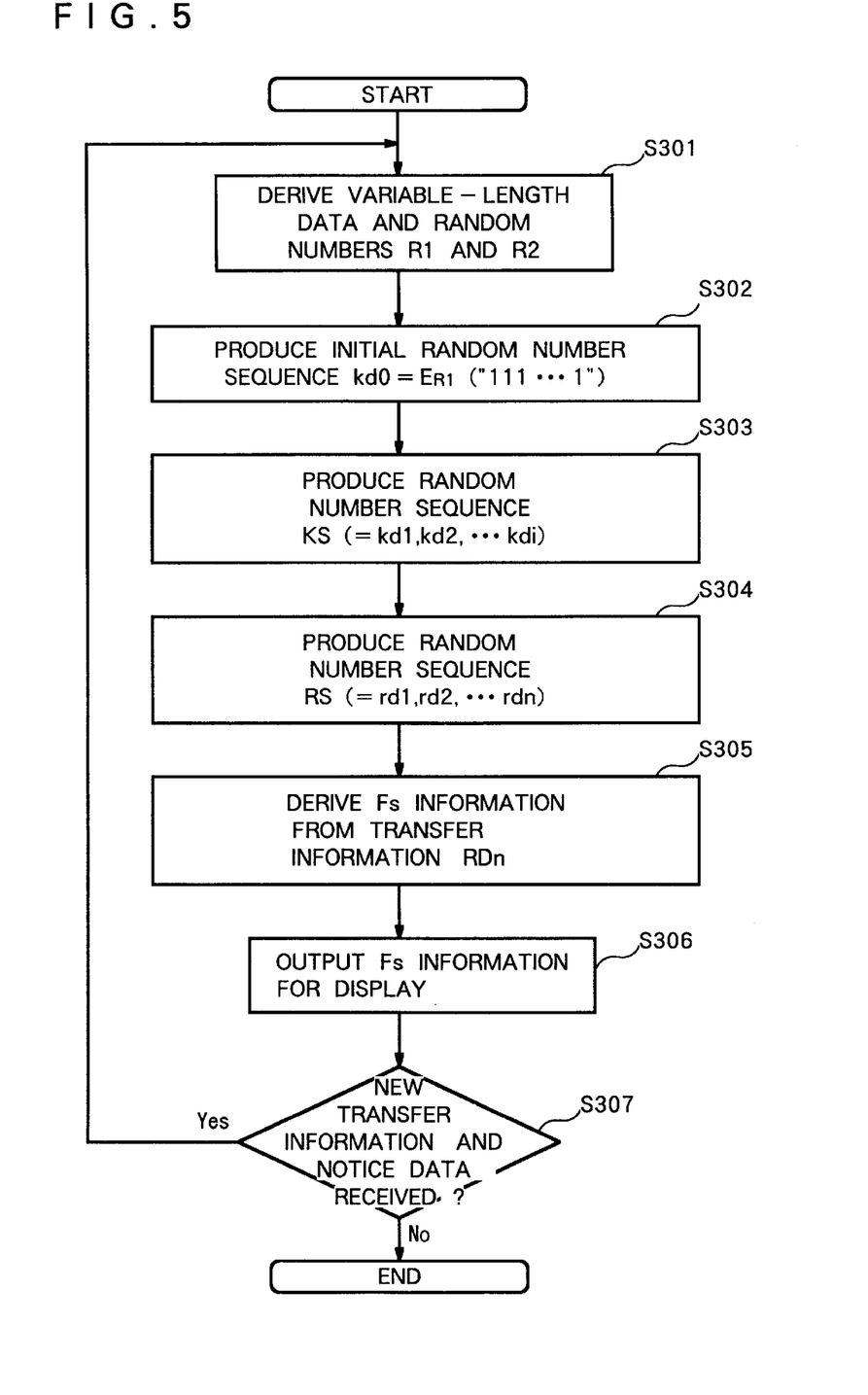
FIG. 5 is a diagram for explaining an information reproducing procedure performed in the member terminal.

In FIG. 5, first at step S301, the communication device 6 derives the transmission master key, that is, the variable-length data and the natural random numbers R1 and R2, from the notice data. As appreciated, this step corresponds to step S207 in FIG. 4. Then, at step S302, the variable-length data ("111 . . . 1") is encrypted through the SXAL/MBAL using the natural random number R1 as an encryption key to produce an initial random number sequence kd0 (=$E_{R1}$("111 . . . 1")). Then, at step S303, exclusive OR operations are performed between the corresponding bytes of the initial random number sequence kd0 and the reference logical value 01 h so as to produce a random number sequence KS (=kd1, kd2, . . . kdi). Subsequently, at step S304, the random number sequence KS is encrypted through the SXAL/MBAL using the natural random number R2 as an encryption key to produce a random number sequence RS (=rd1, rd2, . . . rdn). The initial random number sequence kd0, the random number sequence KS and the random number sequence RS produced at steps S302, S303 and S304 are identical with those produced at steps S103, S104 and S105 in FIG. 3, respectively.

Subsequently, at step S305, an exclusive OR operation is performed per bit between the thus produced random number sequence RS and the received transfer information RDn so as to derive the foregoing Fs information. Then, at step S306, the derived Fs information is sent to the information reproducing device 7 for display. Subsequently, at step S307, it is checked whether new transfer information RDn and notice data are received. If positive, the procedure returns to step S301, while, if negative, the information reproducing procedure is terminated.

In the foregoing first preferred embodiment, it may be arranged that a cancel signal can be transmitted to the member administrative server S from the member terminal T, for example, from the card interface section 61 via the communication control section 62, within a given fixed time. The cancel signal stops further execution of the processes in the member administrative server S including updating of the account data in the member data administrative device 5.

In the foregoing first preferred embodiment, the information is transferred from the member administrative server S upon request from the member terminal T. On the other hand, the unidirectional transmission of the information to all the member terminals T is also possible. In this case, the authenticating section 36 of the member administrative server S encrypts the variable-length data and the natural random numbers R1 and R2 using a public net-key common to all the members so as to produce notice data, and transmits the notice data to all the member terminals T. Thereafter, the logic circuit 34 performs an exclusive OR operation per bit between Fs information and a variable-length random number sequence RS to produce transfer information RDn and transmits the transfer information RDn to all the member terminals T via the communication control section 35. If the result of authentication performed at step S201 in FIG. 4 is positive, each of the member terminals T decodes the received notice data using the public net-key stored in the IC card C1 so as to derive the variable-length data and the natural random numbers R1 and R2, and produces a variable-length random number sequence RS based on the variable-length data and the natural random numbers R1 and R2. Further, an exclusive OR operation is performed per bit between the thus produced variable-length random number sequence RS and the received transfer information to reproduce the Fs information. The other processes are the same as those in the foregoing first preferred embodiment.

Figure 6A:
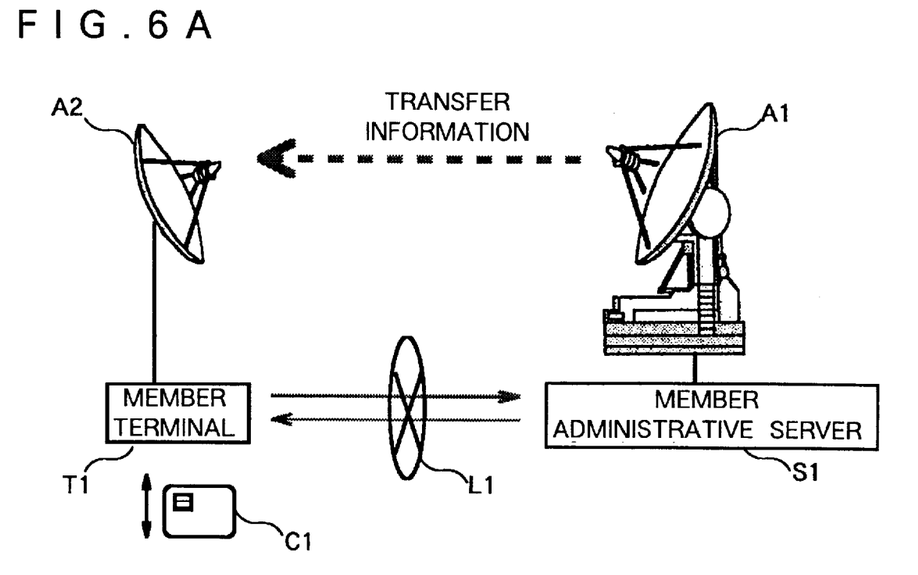
FIG. 6A is a diagram schematically showing a structure of a communication system according to a second preferred embodiment of the present invention.

FIG. 6A is a schematic structural diagram of a membership communication system according to a second preferred embodiment of the present invention, wherein a satellite broadcast is employed.

Specifically, a member administrative server S1 and a member terminal T1 are connected via a public network L1 and via satellite broadcast antennas A1 and A2. The second preferred embodiment is the same as the foregoing first preferred embodiment except that the transfer information RDn is transmitted using the satellite broadcast, that is, from the antenna A1 to the antenna A2, and the other communications between the member administrative sever S1 and the member terminal T1 are achieved through the public network L1.

Figure 6B:
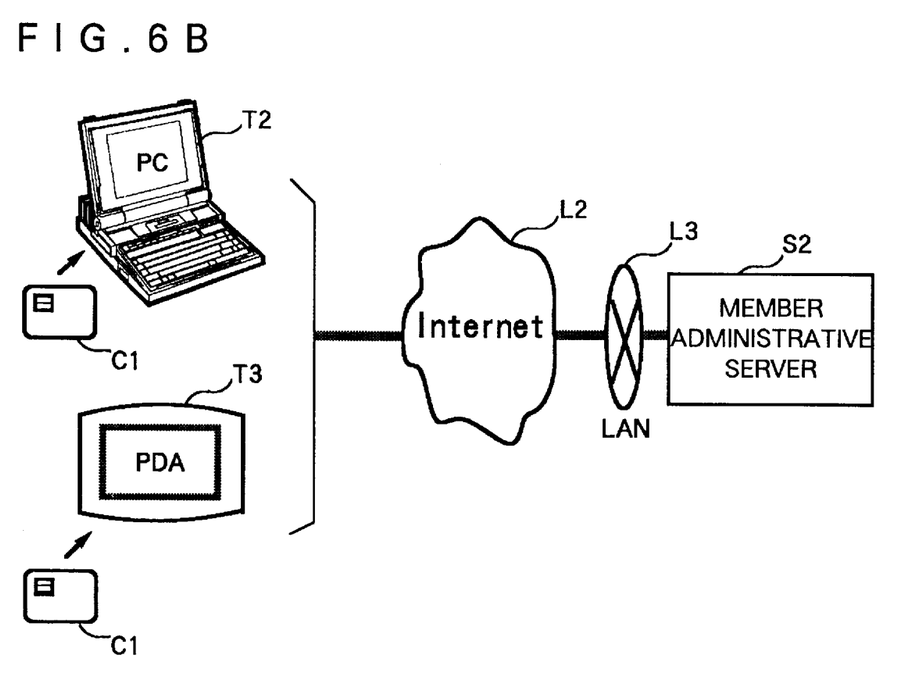
FIG. 6B is a diagram schematically showing a structure of a communication system according to a third preferred embodiment of the present invention.

FIG. 6B is a schematic structural diagram of a membership communication system according to a third preferred embodiment of the present invention.

In this preferred embodiment, a programmed portable PC (personal computer) or a programmed portable PDA (personal digital assistant) is used as a member terminal T2 or T3, and a member administrative server S2 and the member terminal T2 or T3 are connected via the Internet L2 or a LAN (local area network) L3. In any case, an IC card C1 storing a private net-key unique to a member or a public net-key common to all the members is used for a user authentication in the same manner as described in the foregoing first preferred embodiment. The other processes are also the same as those described in the foregoing first preferred embodiment.

As appreciated from each of the foregoing preferred embodiments, since the same variable-length random number sequences RS can be produced at the member administrative server S (S1, S2) and the member terminal T (T1, T2, T3), it is sufficient to provide one random number generator 4 only at the member administrative server S. Further, since the process for synchronization, essential in the prior art, is not necessary, the processing time can be shortened. Further, the use of the variable-length random number sequence RS fully ensures difficulty in interpreting the same by a third party, which is essential in the stream cryptography. Accordingly, the high-speed processing as well as the high security can be simultaneously satisfied.

While the present invention has been described in terms of the preferred embodiments, the invention is not to be limited thereto, but can be embodied in various ways without departing from the principle of the invention as defined in the appended claims.

For example, the present invention is also applicable to an information transfer system using the CATV or an encryption CD-ROM delivery system.

Further, although it is preferable to use the cryptographic algorithm of SXAL/MBAL for enhancing the speed of the processing and the security, various other cryptographic algorithms can be used for producing the variable-length random number sequence RS.

Further, although the two natural random numbers R1 and R2 are used in the foregoing preferred embodiments, it may be arranged to use only one natural random number for producing a variable-length random number sequence to be used for stream-encrypting the information.

Further, the foregoing transfer information and notice data may be transferred from the member administrative server to the member terminal via a portable storage medium, such as a CD-ROM, a flexible disk or a magneto-optical disk.

What is claimed is:

1. A data transfer method for transferring digital data from a data transmitter device to a data receiver device, said method comprising a data transmitting step performed by said data transmitter device and a data reproducing step performed by said data receiver device, each of said data transmitter device and said data receiver device using a cryptographic algorithm in which bidirectional data displacement of object data from a head to an end thereof and from the end to the head thereof is performed, said data transmitting step comprising the steps of:
producing variable-length data having a data length corresponding to said digital data;
encrypting said variable-length data using at least one natural random number to produce a first variable-length random number sequence based on said cryptographic algorithm;
performing an exclusive OR operation per bit between said first variable-length random number sequence and said digital data to derive transfer data;
transmitting said transfer data to said data receiver device; and
transmitting said variable-length data and said at least one natural random number in an encrypted manner to said data receiver device, and said data reproducing step comprising the steps of:
reproducing said variable-length data and said at least one natural random number transmitted from said data transmitter device in the encrypted manner;
encrypting said variable-length data using said at least one natural random number to produce a second variable-length random number sequence based on said cryptographic algorithm, said second variable-length random number sequence identical with said first variable-length random number sequence; and
performing an exclusive OR operation per bit between said second variable-length random number sequence and said transfer data transmitted from said data transmitter device to reproduce said digital data.

2. The data transfer method according to claim 1, wherein said transfer data is transferred from said data transmitter device to said data receiver device via a portable storage medium.

3. The data transfer method according to claim 1, wherein said cryptographic algorithm is a cryptographic algorithm of SXAL/MBAL.

4. A data transfer method for transferring digital data from a data transmitter device to a data receiver device, said method comprising a data transmitting step performed by said data transmitter device and a data reproducing step performed by said data receiver device, each of said data transmitter device and said data receiver device using a cryptographic algorithm in which bidirectional data displacement of object data from a head to an end thereof and from the end to the head thereof is performed, said data transmitting step comprising the steps of:
producing variable-length data having a data length corresponding to said digital data;
encrypting said variable-length data using a first natural random number to produce a first variable-length random number sequence based on said cryptographic algorithm;
performing exclusive OR operations between said first variable-length random number sequence and a reference logical value to derive a second variable-length random number sequence;
encrypting said second variable-length random number sequence using a second natural random number to derive a third variable-length random number sequence based on said cryptographic algorithm;
performing an exclusive OR operation per bit between said third variable-length random number sequence and said digital data to derive transfer data;
transmitting said transfer data to said data receiver device; and
transmitting said variable-length data, said first and second natural random numbers and data indicative of the using order of said first and second natural random numbers in an encrypted manner to said data receiver device, and said data reproducing step comprising the steps of:
reproducing said variable-length data, said first and second natural random numbers and said using order indicative data transmitted from said data transmitter device in the encrypted manner;
encrypting said variable-length data using said first and second natural random numbers and said using order indicative data to produce a fourth variable-length random number sequence based on said cryptographic algorithm, said fourth variable-length random number sequence identical with said third variable-length random number sequence; and
performing an exclusive OR operation per bit between said fourth variable-length random number sequence and said transfer data transmitted from said data transmitter device to reproduce said digital data.

5. The data transfer method according to claim 4, wherein said transfer data is transferred from said data transmitter device to said data receiver device via a portable storage medium.

6. The data transfer method according to claim 4, wherein said cryptographic algorithm is a cryptographic algorithm of SXAL/MBAL.

7. A communication device for transferring digital data to a data receiver device, said communication device comprising:
wherein said data receiver device uses a cryptographic algorithm in which bidirectional data displacement of object data from a head to an end thereof and from the end to the head thereof is performed,
variable-length data generating means for producing variable-length data having a data length corresponding to said digital data;
random number acquiring means for acquiring at least one natural random number from a random number generator;
encrypting means for encrypting said variable-length data using said at least one natural random number to produce a variable-length random number sequence based on said cryptographic algorithm;
a logic circuit for performing exclusive OR operations between said digital data and said variable-length random number sequence to derive transfer data; and
communication setting means for sending said variable-length data and said at least one natural random number in an encrypted manner as well as said transfer data to said data receiver device.

8. The communication device according to claim 7, wherein said communication setting means comprises authenticating means for performing an authentication process relative to said data receiver device, and encrypting means for encrypting said variable-length data and said at least one natural random number using a private key unique to said data receiver device when a result of the authentication process is positive, and wherein said communication setting means sends said variable-length data and said at least one natural random number, encrypted by said encrypting means, to said data receiver device.

9. The communication device according to claim 7, wherein said cryptographic algorithm is a cryptographic algorithm of SXAL/MBAL.

10. A communication device for transferring digital data to a data receiver device, said communication device comprising:

wherein said data receiver device uses a cryptographic algorithm in which bidirectional data displacement of object data from a head to an end thereof and from the end to the head thereof is performed, variable-length data generating means for producing variable-length data having a data length corresponding to said digital data;

random number acquiring means for acquiring first and second natural random numbers from a random number generator;

encrypting means for encrypting said variable-length data using said first natural random number to produce a first variable-length random number sequence based on said cryptographic algorithm, performing exclusive OR operations between said first variable-length random number sequence and a reference logical value to produce a second variable-length random number sequence, and encrypting said second variable-length random number sequence using said second natural random number to produce a third variable-length random number sequence based on said cryptographic algorithm;

a logic circuit for performing exclusive OR operations between said digital data and said third variable-length random number sequence to derive transfer data; and communication setting means for sending said variable-length data, said first and second natural random numbers and data indicative of the using order of said first and second natural random numbers in an encrypted manner as well as said transfer data to said data receiver device.

11. The communication device according to claim 10, wherein said communication setting means comprises authenticating means for performing an authentication process relative to said data receiver device, and encrypting means for encrypting said variable-length data, said first and second natural random numbers and said using order indicative data using a private key unique to said data receiver device when a result of the authentication process is positive, and wherein said communication setting means sends said variable-length data, said first and second natural random numbers and said using order indicative data, encrypted by said encrypting means, to said data receiver device.

12. The communication device according to claim 10, wherein said cryptographic algorithm is a cryptographic algorithm of SXAL/MBAL.

13. A communication device for receiving digital data from a data transmitter device, said communication device comprising:

wherein said data transmitter device uses a cryptographic algorithm in which bidirectional data displacement of object data from a head to an end thereof and from the end to the head thereof is performed, data receiving means for receiving transfer data, variable-length data and at least one natural random number from said data transmitter device, said transfer data derived at said data transmitter device as results of exclusive OR operations between said digital data and a first variable-length random number sequence, and said variable-length data and at least one natural random number used at said data transmitter device for deriving said first variable-length random number sequence based on said cryptographic algorithm;

encrypting means for encrypting said received variable-length data using said received at least one natural random number to produce a second variable-length random number sequence based on said cryptographic algorithm; and a logic circuit for performing exclusive OR operations between said received transfer data and said second variable-length random number sequence to reproduce said digital data.

14. The communication device according to claim 13, wherein said cryptographic algorithm is a cryptographic algorithm of SXAL/MBAL.

15. A communication device for receiving digital data from a data transmitter device, said communication device comprising:

wherein said data transmitter device uses a cryptographic algorithm in which bidirectional data displacement of object data from a head to an end thereof and from the end to the head thereof is performed, data receiving means for receiving transfer data, variable-length data, first and second natural random numbers and data indicative of the using order of said first and second natural random numbers from said data transmitter device, said transfer data derived at said data transmitter device as results of exclusive OR operations between said digital data and a first variable-length random number sequence, and said variable-length data, said first and second natural random numbers and said using order indicative data used at said data transmitter device for deriving said first variable-length random number sequence based on said cryptographic algorithm;

encrypting means for encrypting said received variable-length data using said received first natural random number to produce a second variable-length random number sequence based on said cryptographic algorithm, performing exclusive OR operations between said second variable-length random number sequence and a reference logical value to produce a third variable-length random number sequence, and encrypting said third variable-length random number sequence using said received second natural random number to produce a fourth variable-length random number sequence based on said cryptographic algorithm, said fourth variable-length random number sequence identical with said first variable-length random number sequence; and a logic circuit for performing exclusive OR operations between said received transfer data and said fourth variable-length random number sequence to reproduce said digital data.

16. The communication device according to claim 15, wherein said cryptographic algorithm is a cryptographic algorithm of SXAL/MBAL.

17. A computer-readable recording medium storing a program which causes a computer to function as a communication device for transferring digital data to a data receiver device which uses a cryptographic algorithm in which bidirectional data displacement of object data from a head to an end thereof and from the end to the head thereof is performed, said program causing the computer to execute the steps of:

producing variable-length data having a data length corresponding to said digital data;

acquiring first and second natural random numbers from a random number generator;

encrypting said variable-length data using said first natural random number to produce a first variable-length random number sequence based on said cryptographic algorithm;

performing exclusive OR operations between said first variable-length random number sequence and a reference logical value to produce a second variable-length random number sequence;

encrypting said second variable-length random number sequence using said natural random number to produce a third variable-length random number sequence based on said cryptographic algorithm;

performing exclusive OR operations between said digital data and said third variable-length random number sequence to derive transfer data; and sending said variable-length data, said first and second natural random numbers and data indicative of the using order of said first and second natural random numbers in an encrypted manner as well as said transfer data to said data receiver device.

18. A computer-readable recording medium storing a program which causes a computer to function as a communication device for receiving digital data from a data transmitter device which uses a cryptographic algorithm in which bidirectional data displacement of object data from a head to an end thereof and from the end to the head thereof is performed, said program causing the computer to execute the steps of:

receiving transfer data, variable-length data, first and second natural random numbers and data indicative of the using order of said first and second natural random numbers from said data transmitter device, said transfer data derived at said data transmitter device as results of exclusive OR operations between said digital data and a first variable-length random number sequence, and said variable-length data, said first and second natural random numbers and said using order indicative data used at said data transmitter device for deriving said first variable-length random number sequence based on said cryptographic algorithm;

encrypting said received variable-length data using said received first natural random number to produce a second variable-length random number sequence based on said cryptographic algorithm;

performing exclusive OR operations between said second variable-length random number sequence and a reference logical value to produce a third variable-length random number sequence;

encrypting said third variable-length random number sequence using said received second natural random number to produce a fourth variable-length random number sequence based on said cryptographic algorithm, said fourth variable-length random number sequence identical with said first variable-length random number sequence; and performing exclusive OR operations between said received transfer data and said fourth variable-length random number sequence to reproduce said digital data.

* * * * *